United States Patent [19]
Frasier et al.

[11] Patent Number: 5,735,046
[45] Date of Patent: Apr. 7, 1998

[54] METHOD OF MANUFACTURING A MULTIPROPERTY ROTOR DISK

[76] Inventors: Christine M. Frasier, 2496 Lake Crossing, Greenwood, Ind. 46143; James C. Muskat, 8447 Hickory Hill Trail, Mooresville, Ind. 46158; Charles J. Teague, 6843 Balmoral Rd., Indianapolis, Ind. 46241

[21] Appl. No.: 722,805

[22] Filed: Sep. 27, 1996

Related U.S. Application Data

[62] Division of Ser. No. 568,986, Dec. 7, 1995, Pat. No. 5,609,471.

[51] Int. Cl.$^6$ ...................................................... B23P 15/00
[52] U.S. Cl. ............................................. 29/889.2; 29/889
[58] Field of Search ........................... 29/889.2, 889, 29/889.23, 889.22, 889.21, 423, 447, 464, 559; 416/204 R, 204 A, 220 A, 219 R

[56] References Cited

U.S. PATENT DOCUMENTS

| | | |
|---|---|---|
| 3,047,936 | 8/1962 | Knowles . |
| 4,051,585 | 10/1977 | Walker et al. . |
| 4,097,276 | 6/1978 | Six . |
| 4,270,256 | 6/1981 | Ewing . |
| 4,494,287 | 1/1985 | Cruzen et al. . |
| 4,529,452 | 7/1985 | Walker . |
| 4,796,343 | 1/1989 | Wing . |
| 5,109,604 | 5/1992 | Koebele . |
| 5,113,583 | 5/1992 | Jenkel et al. . |
| 5,197,190 | 3/1993 | Coolidge . |
| 5,316,202 | 5/1994 | Murray et al. . |

*Primary Examiner*—Irene Cuda
*Attorney, Agent, or Firm*—Woodard, Emhardt, Naughton, Moriarty & McNett

[57] ABSTRACT

A lightweight high temperature multiproperty rotor disk and method of manufacture for use in a gas turbine engine. The rotor disk of a nickel super alloy and having a plurality of lightweight high temperature single crystal blade attachment lugs bonded thereto. The single crystal high temperature rotor blade attachment lugs being cast in a substantially rectangular shape and bonded to the circumference of the disk. A method of manufacturing the rotor includes positioning the plurality of single crystal attachment lugs on a positioning ring that has locating nests formed thereon. Subsequently, the rotor disk is placed within the bonding ring and a restraining ring is placed around the entire subassembly. Upon subjecting the assembly to high temperature the rotor disk, having a coefficient of thermal expansion greater than the coefficient of thermal expansion of the restraining member, forces the components into a mating relationship. Upon completion of the bonding cycle, the restraining ring is removed from the assembly and the bonding ring is machined away.

1 Claim, 7 Drawing Sheets

METHOD OF MANUFACTURING A MULTIPROPERTY ROTOR DISK

This application is a division of application Ser. No. 08/568,986, filed Dec. 7, 1994, now U.S. Pat. No. 5,609,471.

BACKGROUND OF THE INVENTION

The present invention relates generally to the design and construction of a lightweight high temperature rotor disk system for a gas turbine engine. More particularly, the present invention has one form wherein a plurality of high strength blade attachment lugs, which are cast of a single crystal alloy material, are bonded to a conventional powder metal nickel alloy disk. The high performance blade attachment lugs of the present invention have higher strength properties at elevated temperatures relative to conventional nickel alloy rims with no effective increase in weight. Although the invention was developed for use in gas turbine engines, certain applications may be outside of this field.

A gas turbine engine is typical of the type of turbomachinery in which the invention described herein may be advantageously employed. It is well known that modern designers of gas turbine engines have generally utilized an axial flow compressor for compressing air to the proper pressure required for supporting the combustion of fuel in a combustion chamber. The high temperature exhaust gas exiting the combustion chamber provides the working fluid for the turbine, which powers the axial flow compressor. A power turbine that is driven by the flow of high temperature gas is utilized to turn a propeller, fan or other device. Further, the high temperature gas may be used directly as a thrust for providing motive power, such as in a turbine jet engine.

It is well known that the performance of gas turbine engines increase with the increase in the operating temperature of the flow of high temperature gas from the combustion chamber. A factor limiting the allowable temperature of the gaseous working flow from the combustion chamber is the capability of the various engine components to not degrade when exposed to the high temperature gas flow. Further, maintainability of the gas turbine engine necessitates that the various components that are subjected to the high temperature gas flow must be readily serviceable in order to minimize the down time of the gas turbine engine and the cost associated with repairs thereto. Various techniques have been utilized by engine designers to increase the allowable temperature of the gaseous working fluid, and to enhance the serviceability of engine components.

Gas turbine engine designers have generally sought to increase specific thrust, and reduce the specific fuel consumption in a gas turbine engine. However, associated with these parameters has generally been an increase in turbine inlet temperature and compressor discharge temperature. While the elevated fluid temperatures have increased the performance of the gas turbine engines it has resulted in higher blade platform, stalk, and attachment temperatures which have been generally lowered by using additional compressor discharge cooling air. Further, the prior designers of gas turbine engines have sought to reduce the attachment temperature by increasing the stalk length of the blade to isolate the rim from the hot gaseous fluid flow path.

Cooling of the various components of the gas turbine engine is preferably accomplished with a minimum amount of cooling fluid, since the cooling fluid is working fluid which has been extracted from the compressor and its loss from the gas flow rapidly reduces engine efficiency. Therefore, the use of additional cooling fluid to cool the engine components increases the specific fuel consumption. Further, the design efforts to increase the temperature of the compressor discharge fluid, which is used to cool the blade platform, stalk and attachment compounds the cooling and specific fuel consumption issues.

With reference to FIG. 1, there is illustrated a conventional gas turbine blade 'a' that is carried by a rotor disk (not illustrated). Gas turbine blade 'a' has as principle regions an airfoil 'b', an attachment portion 'c' and a stalk 'd' which extends between the attachment portion 'c' and the airfoil 'a'. A blade platform 'e' is disposed above the stalk 'd' and is designed to shield the turbine wheel from the flow of high temperature gas from the combustion chamber. In many designs the stalk 'd' function to elevate the platform 'e' from the wheel in order to minimize heat transfer to the wheel, and the corresponding degradation thereof. One limitation generally associated with the prior design is that the platform 'e' and the stalk 'd' increase the weight, centrifugal pull and attachment stress on the rotor system.

Heretofore, there has been a need for a lightweight high temperature rotor disk for use in a gas turbine engine. The present invention satisfies this need in a novel and unobvious manner.

SUMMARY OF THE INVENTION

One form of the present invention contemplates a combination, comprising: a rotor disk; a plurality of single crystal attachment lugs positioned along the circumference of the rotor disk; and, a restraining member positioned adjacent the radial outward surface of the plurality of attachment lugs, the restraining member having a coefficient of thermal expansion less than the coefficient of thermal expansion of the rotor disk.

Another form of the present invention contemplates a method for bonding single crystal attachment lugs to a rotor disk. The method comprising: providing a restraining member; positioning the single crystal attachment lugs along the circumference of the rotor disk; placing the restraining member around the radial outward surface of the attachment lugs, and heating the assembly of the prior steps to join the attachment lugs and the rotor disk.

One object of the present invention is to provide an improved rotor system for a gas turbine engine.

Related objects and advantages of the present invention will be apparent from the following description.

DESCRIPTION OF THE PREFERRED EMBODIMENT

Figure 1:
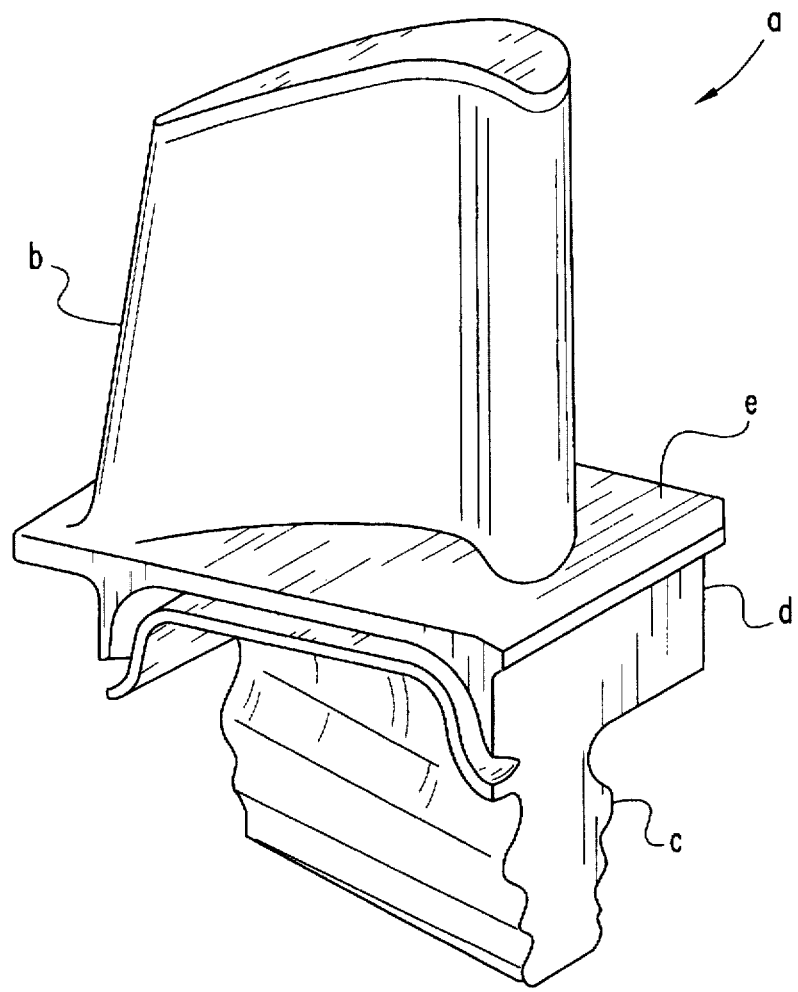
FIG. 1 is a perspective view of a prior art gas turbine blade.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
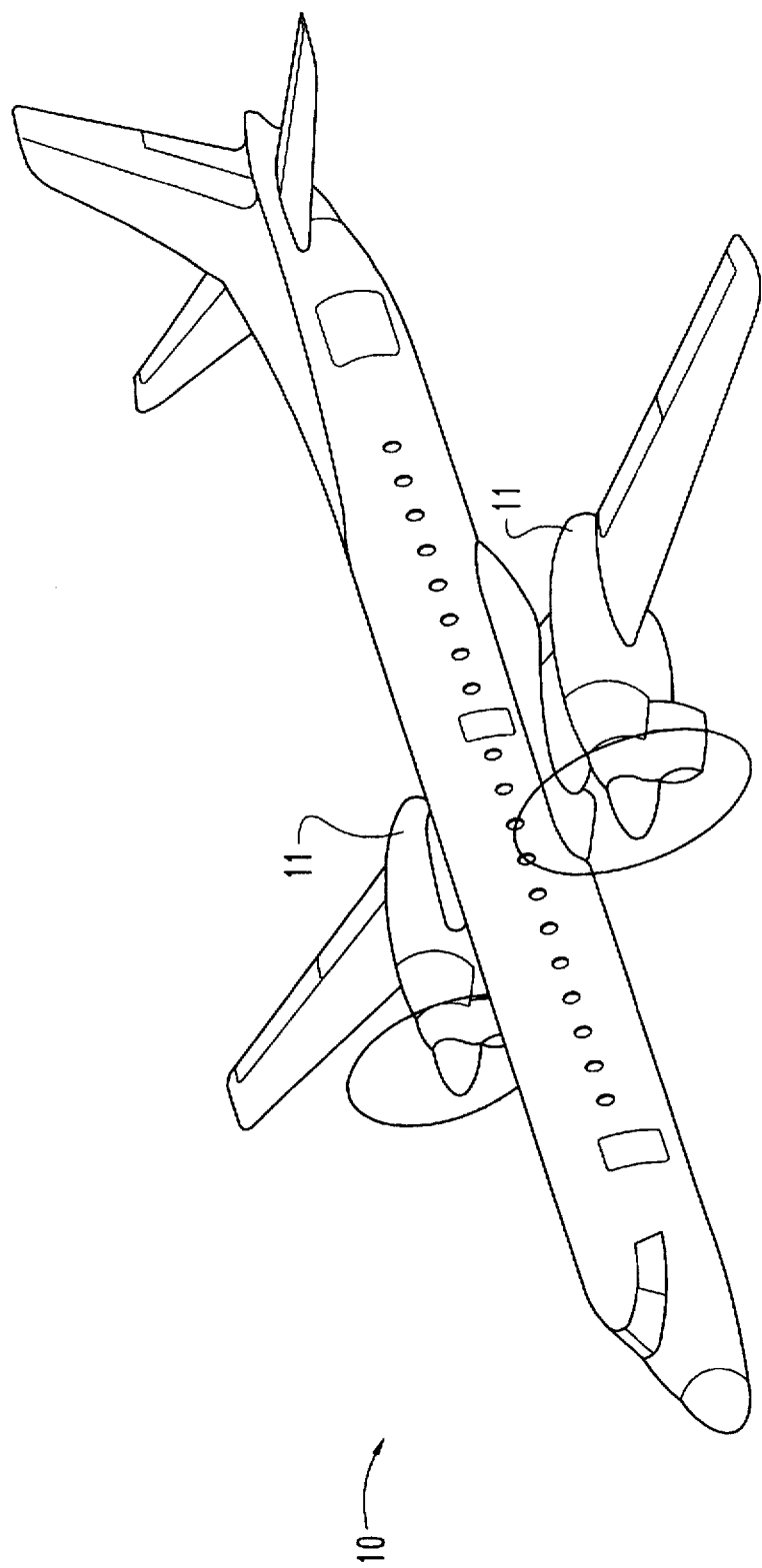
FIG. 2 is a perspective view of an aircraft having a gas turbine engine connected thereto.
Figure 3:
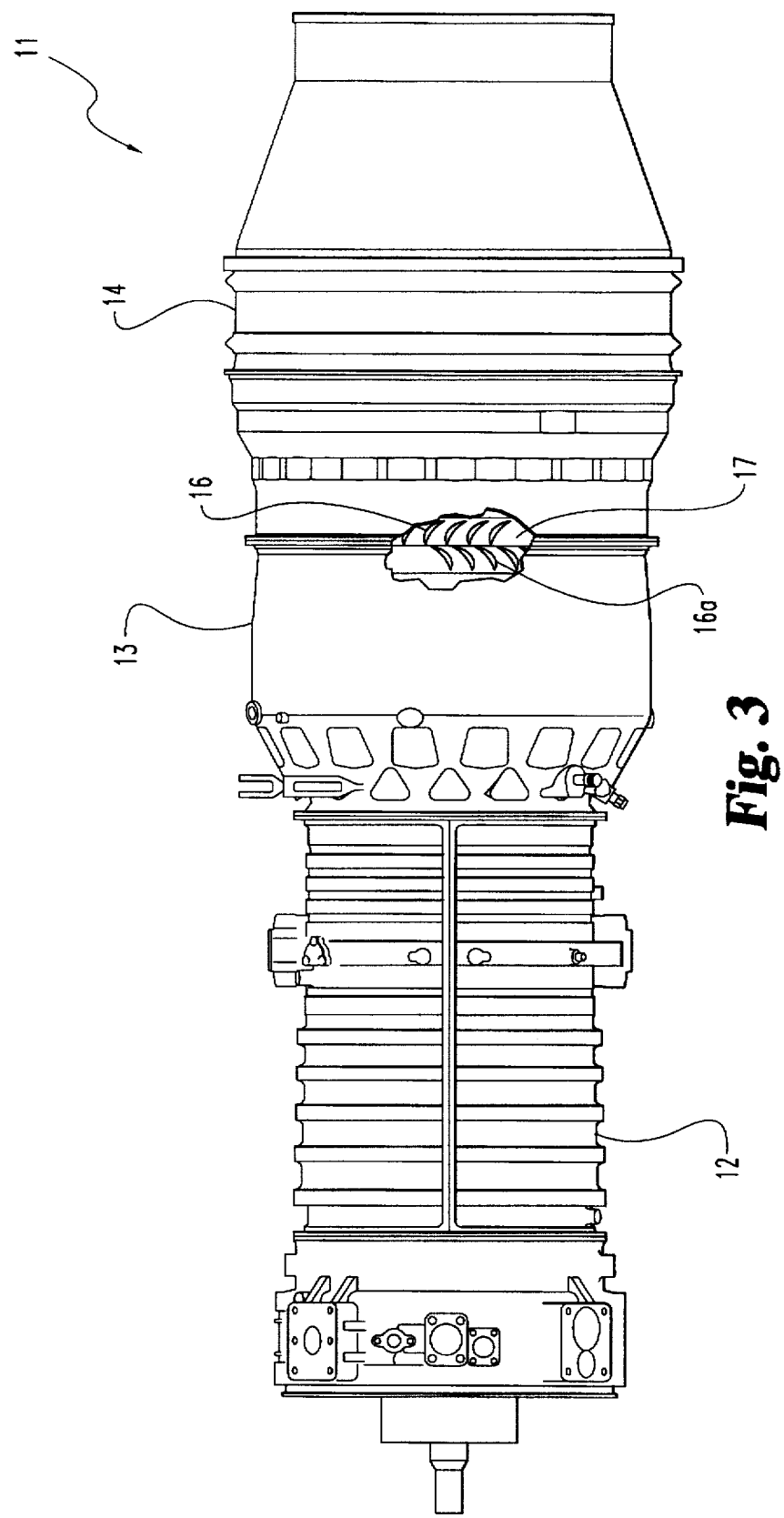
FIG. 3 is an enlarged partially fragmented side elevational view of the gas turbine engine of FIG. 2.

Referring to FIGS. 2 & 3, there is illustrated an aircraft 10 having an aircraft flight propulsion engine 11. It is understood that an aircraft is generic and includes helicopters, tactical fighters, trainers, missiles and other related apparatuses. In the preferred embodiment the flight propulsion engine 11 includes a compressor 12, a combustor 13 and a power turbine 14. It is important to realize that there are a multitude of ways in which the components can be linked together. Additional compressors and turbines could be added with inner coolers connecting between the compressors and reheat combustor chambers could be added between the turbines. Further, the gas turbine engine is equally suited to be used for industrial application. Historically there has been wide spread application of industrial gas turbine engines, such as pumping sets for gas and oil transmission lines, electricity generation and navel propulsion.

With reference to FIG. 3, there is illustrated an enlarged partially fragmented view of gas turbine engine 11 having a rotor system therein. A plurality of turbine blades 16 are insertably mounted to a disk 17 that is affixed to a tubular shaft within the gas turbine engine 11. A plurality of turbine vanes 16a forms a portion of the nozzle within the gas turbine engine. In the preferred embodiment the gas turbine blades 16 and vanes 16a are unitary cast alloy structures produced by a precision casting operation utilizing various super alloy compositions. Various types of super alloy compositions and manufactures of such compositions are known to those skilled in the art. Most super alloy compositions of interest are complicated mixtures of nickel, chromium, aluminum and other select elements. One technique for producing a cast unitary turbine blade 16 or vane 16a having equiaxed, directionally solidified, and single crystal alloy structures is disclosed in U.S. Pat. No. 5,295, 530 to O'Connor which is incorporated by reference herein. In the preferred embodiment the gas turbine blade 16 and vanes 16a are of a single crystal alloy structure. It is understood that a gas turbine blade and a gas turbine vane are often referred to as an airfoil.

As used herein, a single crystal article is one in which substantially all of the article has a single crystallographic orientation through the load bearing portions, without the presence of high angle grain boundaries. A small amount of low angle grain boundaries such as tilt, or twist boundaries are permitted within such a single crystal article but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations are within the scope of the term single crystal as used herein.

Figure 4:
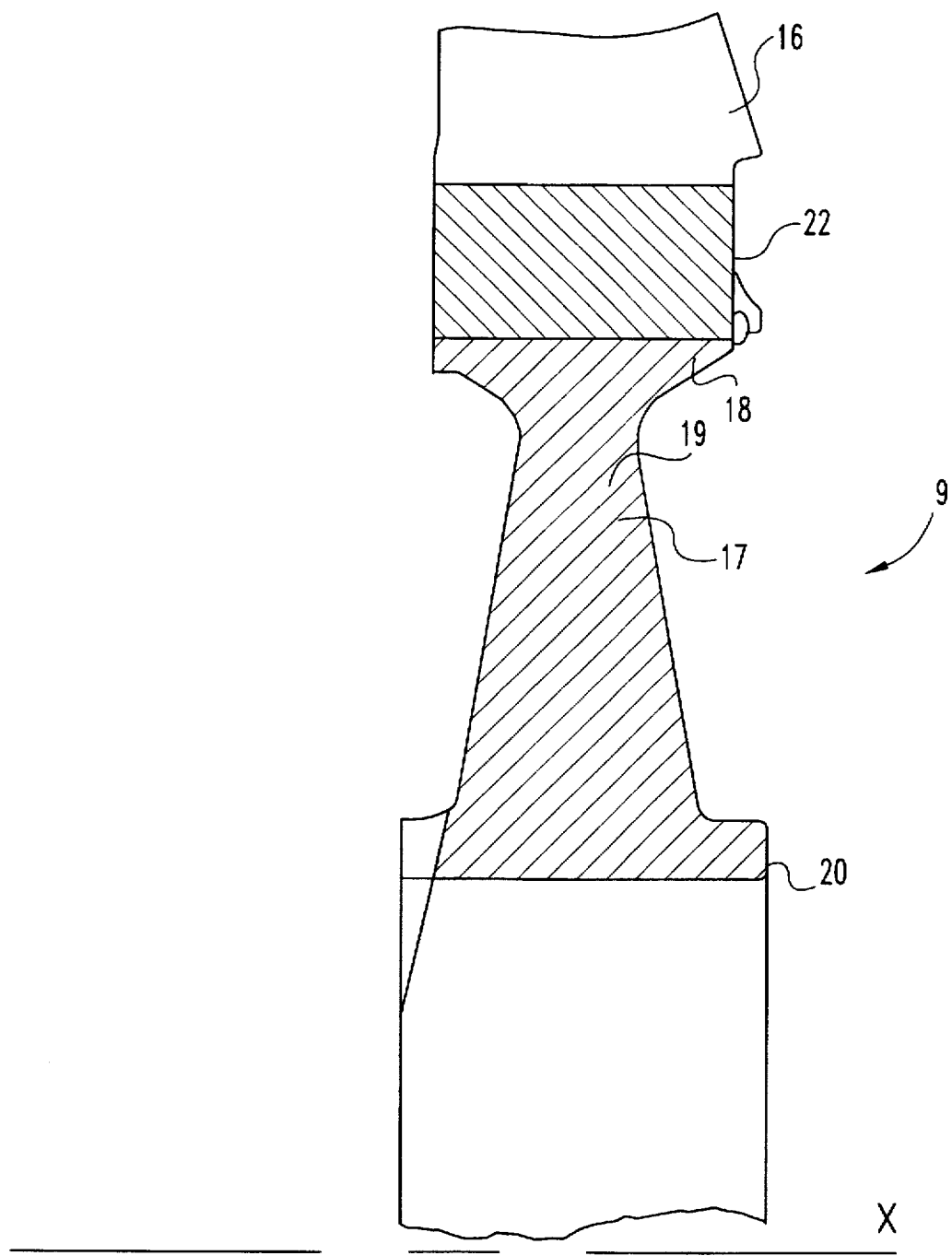
FIG. 4 is an illustrative partial side elevation sectional view of a rotor with a high temperature turbine blade attachment lug according to one form of the present invention.

With reference to FIG. 4, there is illustrated a sectional view of a rotor system 9. It is understood that the rotor disk 17 is symmetrical about an axial centerline 'x' of the gas turbine engine 11. In the preferred embodiment the rotor disk 17 has a plurality of circumferentially spaced turbine blades 16 attached thereto. The rotor disk 17 includes a thickened rim section 18, a relatively thin web section 19 and a thickened bore section 20. A rotor disk may have other geometric configurations, such as a uniform axial thickness from the bore section to the rim section. The plurality of turbine blades 16 extend radially outward from the rim portion 18 and are carried by the disk 17.

In the preferred embodiment the rotor system 9 is designed and manufactured for installation into a turbine 14 of a flight propulsion engine 11. While the present invention has been described for use in a turbine, it is realized by those skilled in the art that it has applications in a compressor. In the preferred embodiment the disk 17 is formed of a powder metal nickel super alloy. In the most preferred embodiment the disk 17 is formed of AF2-1DA-6 powder metal material which contains the following elements: about 0.04% carbon, about 12% chromium, about 10% cobalt, about 2.75% molybdenum, about 6.5% tungsten, about 2.8% titanium, about 1.5% tantalum, about 4.6% aluminum, about 0.015% boron, about 0.10% zirconium, and about 59.695% nickel. It is contemplated that the disk 17 can be formed of other materials having similar properties to the materials cited herein.

In one form of the present invention a flow of cooling fluid from the compressor 12 is discharged through a mechanical structure within the gas turbine engine 11 and directed to cool the rotor system 9. A commonly owned U.S. patent application Ser. No. 08/509,777 filed Aug. 1, 1995 discloses among other things a related cooling structure. U.S. patent application Ser. No. 08/509,777 is incorporated herein by reference.

Figure 5:
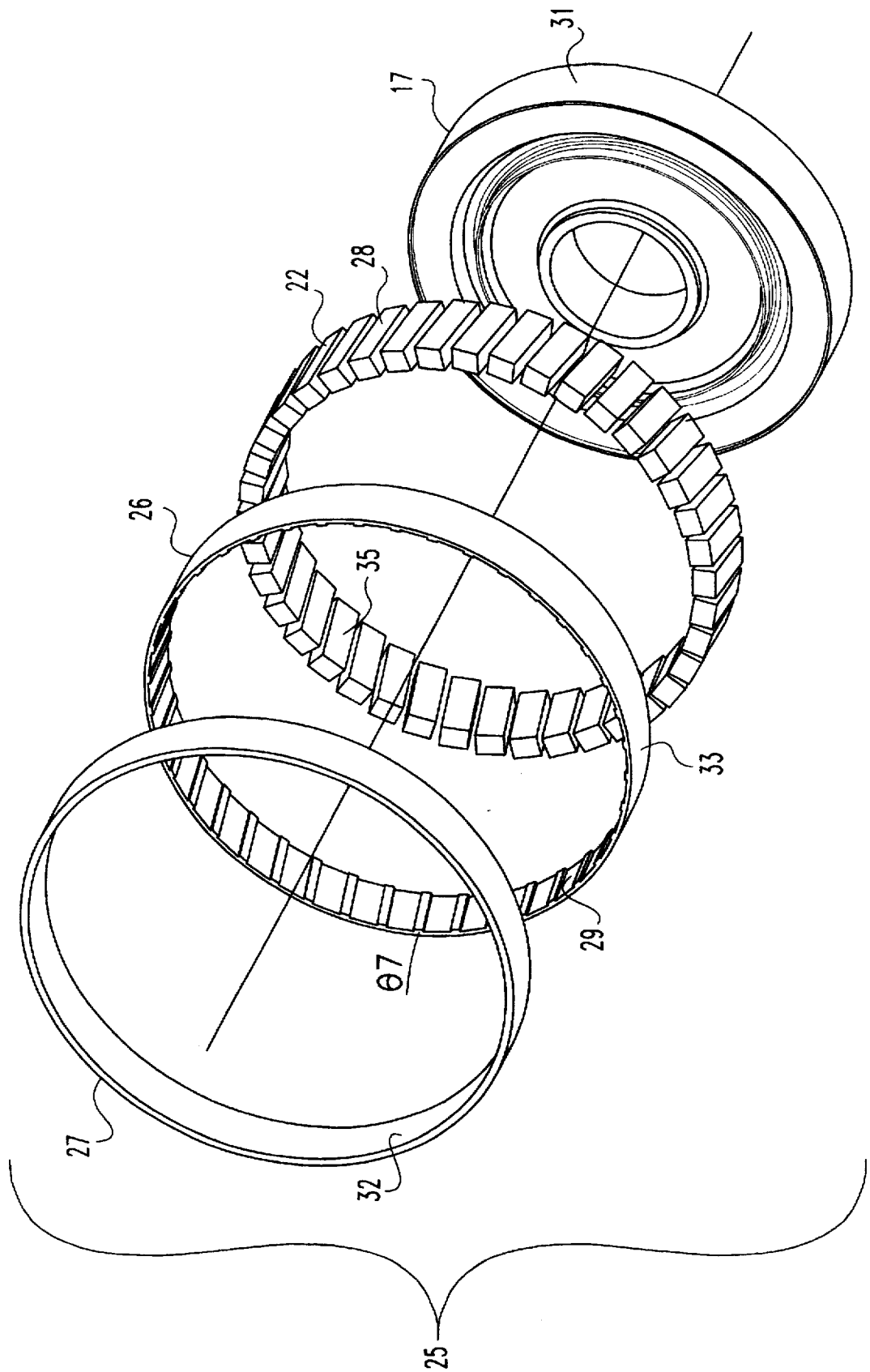
FIG. 5 is an exploded assembly view of a rotor assembly and fabrication tooling according to one form of the present invention.

Referring to FIG. 5, there is illustrated an exploded view of the rotor assembly and fabrication tooling 25. The rotor assembly and fabrication tooling 25 includes rotor disk 17, a plurality of blade attachment lugs 22, a bond positioning ring 26, and a restraining ring 27. In one form of the present invention the disposable bond positioning ring 26 is fabricated from a conventional steel alloy. In contrast the restraining ring 27 is designed and manufactured as a reusable tool capable of withstanding the high temperature environment associated with bonding the plurality of attachment lugs 22 to the circumference of disk 17. Bonding of the plurality of attachment lugs 22 to disk 17 is accomplished through techniques known to those skilled in the art and include diffusion bond brazing in which a hyper eutectic composition of nickel, chromium, and boron (Ni—Cr—B) is used.

In the preferred embodiment each of the plurality of blade attachment lugs 22 are formed as a cast solid crystal article. It is preferred that the net cast shape be substantially rectangular. Each of the rectangular shaped lugs 22 including a planar outer surface 28 that is positionable within a nest 29 of the bond positioning ring 26. Other geometric shapes for attachment lugs are contemplated herein, and the use of these lugs depends upon the design of the specific rotor system. As previously discussed herein, U.S. Pat. No. 5,295,530 to O'Connor discloses a method for producing a single crystal article. In the most preferred embodiment the single crystal alloy material has the following composition: about 6.5% chromium, about 9.0% cobalt, about 0.6% molybdenum, about 6.0% tungsten, about 1.0% titanium, about 6.5% tantalum, about 5.6% aluminum, about 61.8% nickel and about 3.0% rhenium. Material of this composition is currently available from Cannon-Muskegan Corporation of Muskagan, Michigan and is sold under the trademark of CMSX-4®. It is understood that the lugs 22 can be formed of other single crystal alloy materials having similar properties to the materials recited herein.

Figure 6:
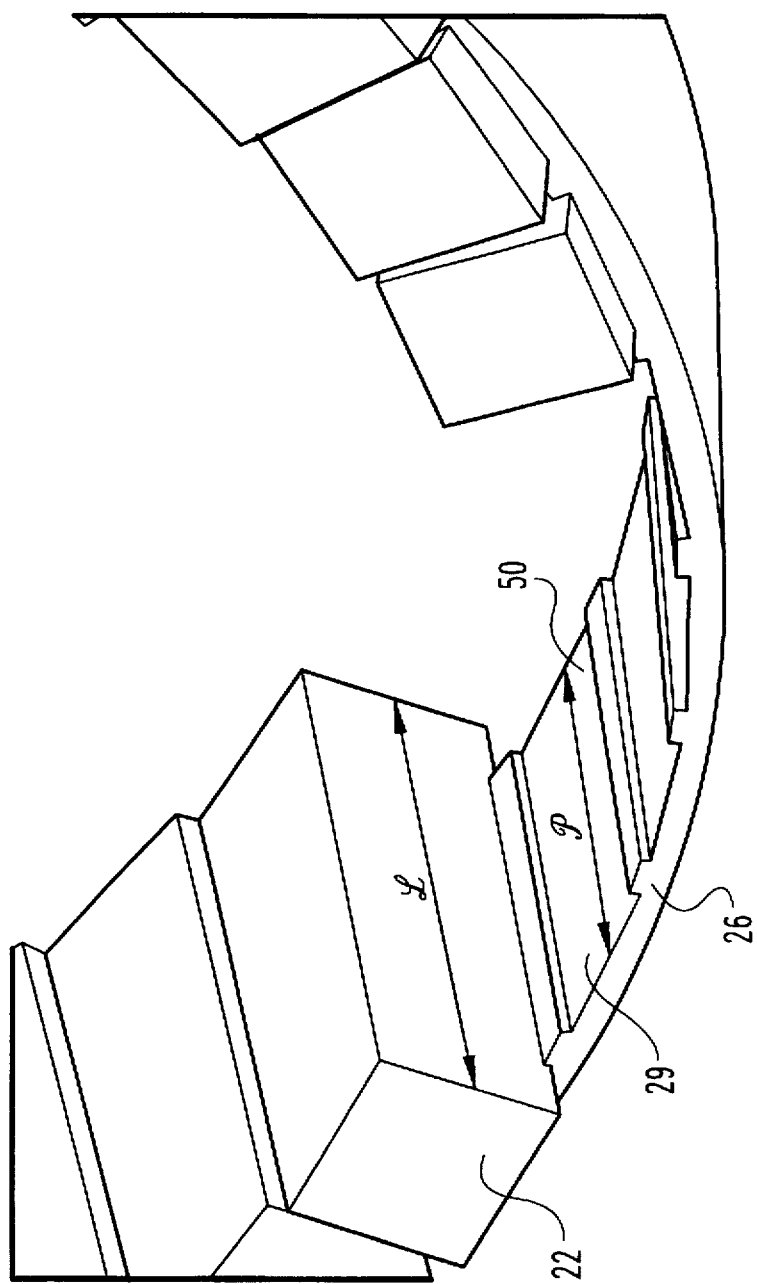
FIG. 6 is a partial enlarged perspective view of the bond ring and high temperature turbine blade attachment lug comprising a portion of the FIG. 5 rotor assembly and fabrication tooling.

Referring to FIGS. 5 and 6, there is illustrated a substantially cylindrical bond positioning ring 26 that is utilized to receive, position and hold the plurality of blade attachment lugs 22 during the rotor system manufacturing process. In the preferred embodiment the bond positioning ring 26 is formed of a conventional steel alloy that will lose its structural integrity when subjected to the high temperatures necessary to diffusion bond the attachment lugs 22 to the disk 17. Bond positioning ring 26 has formed thereon a plurality of circumferentially spaced nests 29. In the preferred embodiment the plurality of nests 29 are uniformly spaced and have been machined on the inner cylindrical surface of the bond positioning ring 26. Nests 29 in the preferred embodiment are defined as slots having a planar surface that receive the planar surface 28 of the attachment lugs 22. It is understood that nests having other geometric shapes can be utilized to retain the blade attachment lugs 22 on the bond positioning ring 26.

Blade attachment lugs 22 are fixedly attached to the inner cylindrical surface of the bond positioning ring 26 at the respective nest 29 locations. In the preferred embodiment the plurality of blade attachment lugs 22 are attached at each nest location 29 by brazing. Other techniques of affixing the blade attachment lugs 22 to the bond positioning ring 26 such as tack welding are contemplated herein. Attachment of the blade attachment lugs 22 to the ring 26 maintains their respective orientation during the manufacturing process. In one form of the present invention the plurality of nests 29 are oriented at an angle Θ to the axial centerline, and in one embodiment the angle Θ is about ten degrees. It is understood that other angles are contemplated herein, and are perimeters best left to the design of the specific rotor system. Parameters such as the number of blade attachment lugs, the number of blades, and the size of the hub will vary based upon specific requirements of the rotor system.

The restraining ring 27 is utilized during the manufacturing process to minimize and/or eliminate outward radial movement of the components during the diffusion bonding process. In the preferred embodiment the restraining ring 27 is a cylindrical member. However, the restraining ring 27 can have an outer surface of any shape so long as the member has a substantially cylindrical internal surface 32. Prefereably, the restraining ring 27 has an inside diameter sized such that at room temperature it will slip over the bond positioning ring 26. Therefore at room temperature when the restraining ring 27 is placed around the bond positioning ring 26 there is some radial clearance between the substantially cylindrical internal surface 32 of the bond restraining ring 27 and the substantially cylindrical outer surface 33 of the bond positioning ring 26.

In the preferred embodiment the plurality of blade attachment lugs 22 have an axial length (l) which is greater than the axial length (p) of the bond positioning ring 26. The difference in length is designed to minimize the time associated with positioning the blade attachment lugs 22 on the bond positioning ring 26. It is preferred that the axial length of the restraining ring 27 be less than or equal to the axial length of the bond joint between the attachment lugs 22 and the disk 17. In another form of the present invention the axial length of the restraining ring 27 is substantially equal to the axial length of the bond positioning ring 26.

With reference to FIGS. 4–7, a process associated with fabricating a rotor system 9 will now be presented. Each of the plurality of blade attachment lugs 22 are positioned in the nests 29 of the bond positioning ring 26. Positioning of the blade attachment lugs 22 involves locating the outer planar surface 28 adjacent the inner planar surface 50 machined in the inner cylindrical surface of the bond positioning ring 26. It is understood that lugs 22 in the preferred embodiment have four planar surfaces in the axial direction of substantially equal size. However, in another form of the present invention the lugs have surfaces that are of unequal axial length. A single crystal attachment lug 22 is positioned on the disk such that the grain structure is oriented in a substantially radial direction. In the preferred embodiment the planar surface 28 of the blade attachment lugs 22 corresponds to the planar surface 50 machined on ring 26. Having located the lugs on the bond positioning ring 26 it is now necessary to fixedly attach them thereto. In the preferred embodiment this is done by a brazing process.

Subsequent to affixing the plurality of blade attachments lugs 22 to the bond positioning ring 26, this assembly is machined. The machining step involves removing material from the inner surface 35 of each of the plurality of blade attachment lugs 22. Inner surfaces 35 of the plurality of blade attachment lugs 22 are machined to correspond to the outer geometric shape and diameter of the disk 17. It is understood that by attaching the plurality of blade attachment lugs 22 to the bond positioning ring 26 all of the attachment lugs can be machined at the same time. Conventional manufacturing equipment such as a lathe and/or grinder are contemplated to machine the inner surfaces 35 of the plurality of blade attachment lugs 22. The machining process produces a cylindrical surface that is positionable at room temperature by a slip fit around disk 17.

After the inner surface 35 of the blade attachment lugs has been machined with sufficient radial clearance, it is positioned around the outer circumferential surface of the disk 17. Restraining ring 27 is then slip fit, at room temperature, over the bond positioning ring 26. The unit is now assembled and ready for the bonding of the plurality of blade attachment lugs 22 to the outer surface 31 of disk 17. It is contemplated that the relative clearances and temperatures at which the prior assembly is undertaken can be adjusted as necessary by someone of ordinary skill in the art. Bonding of the lugs 22 to the disk 17 is accomplished through techniques known to those skilled in the art and include diffusion bond brazing in which a hyper eutectic composition of nickel, chromium, and boron (Ni—Cr—B) is used.

Subjecting the rotor assembly and fabrication tooling 25 to the heat associated with diffusion bonding allows the differential thermal expansion of the mating components to provide the pressure to hold and bond the blade attachment lugs 22 adjacent the outer surface 31 of the disk 17. In the preferred embodiment the disk 17 has a coefficient of thermal expansion that is greater than the coefficient of thermal expansion of the restraining ring 27. The contribution to thermal expansion associated with the single crystal blade attachment lug 22 is very small. Further, upon reaching the diffusion bonding temperature the structural integrity of the bond positioning ring 26 is degraded and it's expansion is null. Therefore, the thermal expansion of the disk 17 forces the outer cylindrical surface 31 into the inner cylindrical surface 35 of the blade attachment lugs 22 to facilitate bonding of the components together. The restraining ring 27 eliminates and/or minimizes the outward radial movement of the components and thereby a compressive force is applied to the components being bonded.

Upon removing the rotor assembly and fabrication tooling 25 from the heating source it is necessary to remove rings 26 and 27 from the rotor system. The outer restraining ring 27 is designed to be slid off of the assembly at room temperature. After the restraining ring 27 has been removed it is then necessary to remove the bond positioning ring 26 from the plurality of blade attachment lugs 22. Cutting of the bond positioning ring 26 from the lugs 22 is accomplished by the use of conventional machining processes. Techniques such as a grinding operation and/or a turning operation are applicable.

In one form of the present invention the rotor disk 17 with lugs 22 bonded thereto is subjected to a heat treating process. Heat treating techniques that are contemplated include an oil quench, a gas fan cool, an air cool, and a furnace cool. The heat treatment techniques are utilized in select situations to restore or enhance localized and/or bulk regions where material inconsistencies resulted from the diffusion bonding process.

Figure 7:
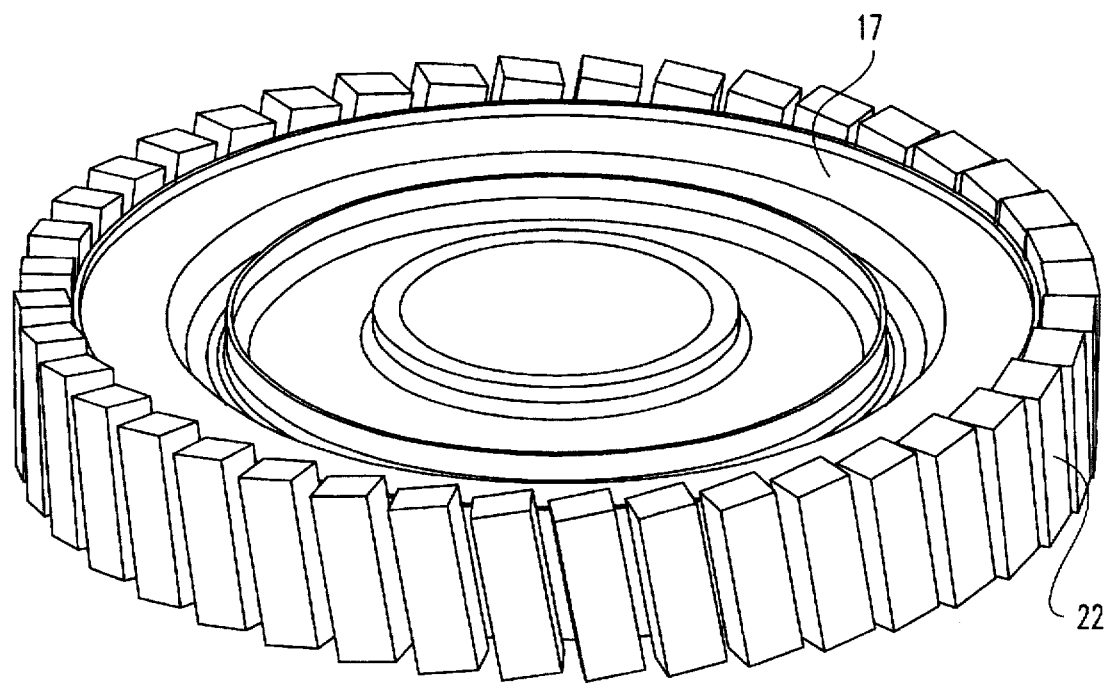
FIG. 7 is a perspective view of the FIG. 5 rotor assembly and fabrication tooling with the fabrication tooling removed.

Referring to FIG. 7, there is illustrated a perspective view of the rotor system prior to the blade attachment lugs 22 being sized and prior to forming the blade interlocking arrangement. In one form of the present invention the blade attachment lugs 22 and the blade 16 will each include an attachment portion that will interlock to connect the blade between a pair of the attachment lugs 22. After the requisite machining operation the attachment portion of blades 16 are insertable between a pair of the blade attachment lugs 22 (not illustrated) A firtree is the terminology recognized by those skilled in the art to describe the interengagement of the attachment portions of the plurality of lugs and blades. A firtree is utilized to more efficiently transfer the blade load to the firtree attachment. The present invention contemplated other methods of attaching the blades to the pair of attachment lugs 22.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for bonding single crystal attachment lugs to a rotor disk, comprising:

providing a restraining member;

positioning the single crystal attachment lugs along the circumference of the rotor disk;

placing the restraining member around the radial outward surface of the attachment lugs; and heating the assembly of the prior steps to join the attachment lugs and the rotor disk.

* * * * *

UNITED STATES PATENT AND TRADEMARK OFFICE
CERTIFICATE OF CORRECTION

PATENT NO : 5,735,046
DATED : April 7, 1998
INVENTOR(S): Christine M. Frasier et al.

It is certified that error appears in the above-identified patent and that said Letters Patent is hereby corrected as shown below:

Column 1, line 6, please insert the following paragraph --This invention was made with Government support under Contract No. N68335-94-C-0205 awarded by the United States Navy. The Government has certain rights in this invention.--

Signed and Sealed this

Eighth Day of June, 1999

Attest:

Q. TODD DICKINSON

*Attesting Officer*    Acting Commissioner of Patents and Trademarks